Aug. 15, 1967 J. H. MILLER 3,336,164

STORAGE BATTERY INTERCELL CONNECTORS

Filed Feb. 23, 1965 2 Sheets-Sheet 1

INVENTOR
JAMES H. MILLER

BY *John E. Stryker*

ATTORNEY

000# United States Patent Office 3,336,164
Patented Aug. 15, 1967

3,336,164
STORAGE BATTERY INTERCELL CONNECTORS
James H. Miller, Minneapolis, Minn., assignor to Gould-National Batteries, Inc., St. Paul, Minn., a corporation of Delaware
Filed Feb. 23, 1965, Ser. No. 434,403
10 Claims. (Cl. 136—134)

This invention relates to improvements in storage battery intercell connectors and more specifically to intercell connectors of the through-partition type.

Prior constructions of intercell connectors have embodied many forms utilizing yieldable bushings or resins as sealing means in attempts to form a fluidtight seal at the cell partition and have utilized fusion or "burning" of the connections to establish good electrical contact.

These connections have required many steps to complete the assembly of parts and have frequently failed during the otherwise normal service life of the batteries. Intercell connectors comprising soft, deformable metallic pins, separate from the lugs to be connected, and held in place by annular deformations have also been suggested. Such pins have not been entirely satisfactory in several respects. Unlike my improved intercell connector members which require deformation and fastening together at one side only of the partition, it is necessary with such prior devices to make a permanent and strong joint at both ends of the pin and at opposite sides of the partition. An example of such pin connectors is described in Rigsby Reissue Patent No. 25,054, dated Oct. 17, 1961. This has a distinct disadvantage in a lead-acid battery where damaging corrosion occurs most frequently at the positive side of the partition where the lug connected to the positive electrodes is located. According to the present invention, the lugs connected to the positive electrodes are integral with the horizontally projecting members which pass through the openings in the intercell partitions, and a single permanent connection is made at the junction of each projecting member with a perforated lug connected to the several negative electrodes of the adjoining cell.

Another feature of the present invention guards against intercell leakage and makes it unnecessary to provide elastic gaskets or other separate sealing means between the intercell partitions and intercell connectors or their lugs in contact with the partitions. This is accomplished by providing a container and intercell partitions formed from a more elastic material than the relatively brittle hard rubber or rubber-like material in common use. Thus the container and partitions are formed from a synthetic resin such as polypropylene or equivalent material having a sufficient degree of elasticity so that it expands when the soft metal intercell connectors are deformed by pressure, as more fully hereinafter described.

The present invention comprises a two-piece intercell connector having a male and a female connector lug portion. The male lug portion has an extension which is pressed through a hole in the intercell partition and into or through a hole provided in the female connector lug on the other side of the partition. Pressure is then applied to both lugs and to the extension to deform the extension into tight sealing relation with the partition and into a sealing and electrical connection with the female lug. This type of connector minimizes the deterioration caused by corrosion, reduces the number of parts to be handled, reduces the number of connections to be made, and reduces the chances of malfunction in the electrical connections between cells.

An object of the present invention is, therefore, to provide an intercell connector composed of a minimum number of parts.

Another object is to provide a connector which is easily assembled.

Still another object is to provide an intercell connector which requires connection with the adjoining cell lug at only one location.

Yet another object is to provide means for obtaining a more reliable fluidtight seal at the partitions separating the cells.

Still another object is to provide a simplified connector strap and lug assembly which readily lends itself to automation of many of the assembly steps.

Another object is to provide an intercell connector with reduced chances of malfunction.

These and other objects of the present invention will be more fully described and pointed out in the following specification and claims.

Referring to the drawings which illustrate a number of modified forms of my inveniton:

The battery casing or container and its cell partitions may be constructed from well known insulating materials. The container and partitions are preferably constructed from a more elastic material adapted to be deformed without breaking or cracking. Materials found suitable for the formation of the containers and partitions of batteries embodying the herein disclosed invention are high molecular weight polypropylene or similar rubbery acid-resistant materials.

The partitions of the battery are prepared for the intercell connectors by drilling or punching or otherwise providing a hole of the desired configuration and dimension at a predetermined location in the partition. The holes or openings in the partitions, when ready for assembly, are preferably free of burrs or other particles which could interfere with and prevent a good fluidtight seal at the partition.

The intercell connectors of the present invention may have any one of several configurations as shown and other configurations not shown herein. They are formed from a soft, malleable, conductive metal such as the commonly used lead or lead-alloy connectors of lead-acid batteries.

Figure 1:
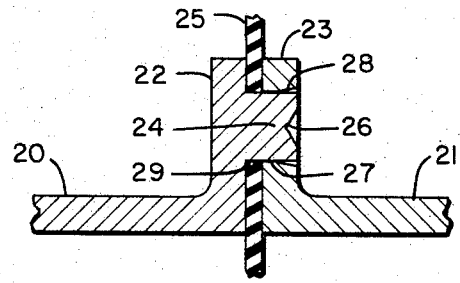
FIGURE 1 is a central vertical sectional view showing adjoining intercell connector straps with their lugs and interconnecting members in position but prior to the deformation thereof.
Figure 3:
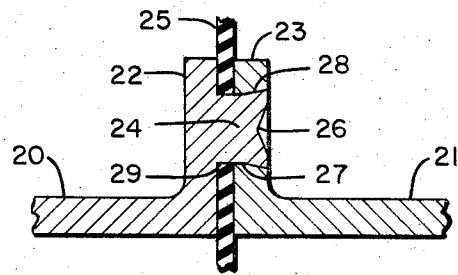
FIG. 3 is a vertical sectional view showing the elements of FIGS. 1 and 2 in their completed, deformed relationship.
Figure 2:
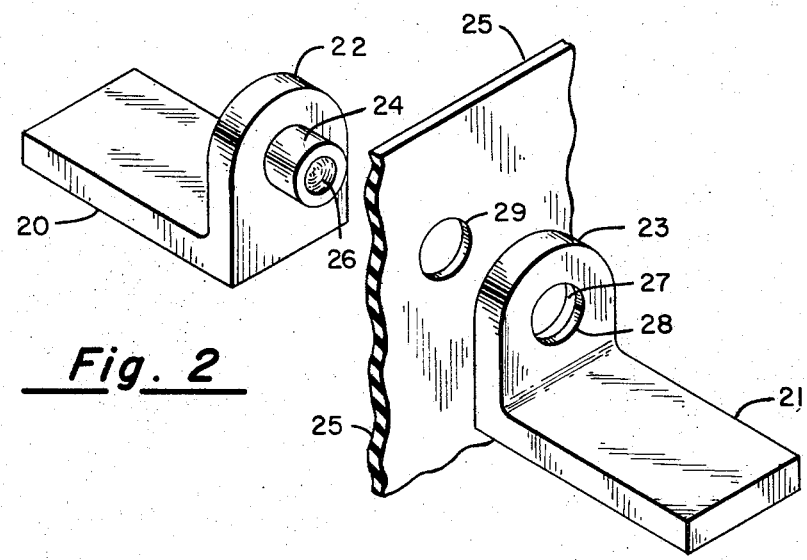
FIG. 2 is a schematic perspective view showing the intercell connector lugs, projecting member and a portion of an intercell partition aligned for assembly.

As shown in FIGS. 1–3, a first intercell connector strap 20 is integrally formed with a lug 22 and a male extension 24 with a flared recess 26 forms the basic male connection portion. A second connector strap 21 integrally formed with a lug 23 has a hole or opening 27 and a flared portion of the opening 28 forms the basic female connection portion. Together they form a two-piece intercell connector upon completion of assembly. All other configurations shown herein are modifications of the basic assembly shown in FIGS. 1–3. The male extension 24 has a cross sectional dimension slightly larger than the dimension of the opening 27 in the lug 23 and less than the flared portion 28 of the opening.

The relative positions of the assembly parts are shown in FIG. 2 ready for assembly. FIG. 3 shows the assembled two-piece connector strap in a fluidtight sealing relationship with the partition 25 and with the lugs 22 and 23 held tightly in a fluidtight sealing relationship against the partition 25. It will be evident that the extension 24, shown in FIG. 3, has been deformed by pressure to displace the metal in the flared recess 26 to substantially fill the flared portion 28 of the opening in the connector 23. This secures the respective connectors in a fluidtight sealing and an electrically connecting relationship. As the metal in the flared recess 26 is pressure deformed, the extension 24 is compressed longitudinally and expands radially to fill the partition opening 29 and thereby further compress the partition 25 around the extension 24 to form a fluidtight seal.

As examples of dimensions of the elements shown in FIGS. 1–3, the diameter of extension 24 may be on the order of .003 inch greater than partition opening 29 and the opening 27 and surfaces defining beveled or flared opening 28 may be disposed at an angle of approximately 10° to the axis of the opening. This provides for a force fit of the parts when assembled and forms a fluidtight seal between adjacent cells due to the deformation of the soft metal intercell connectors and displacement of the partition material.

Figure 4:
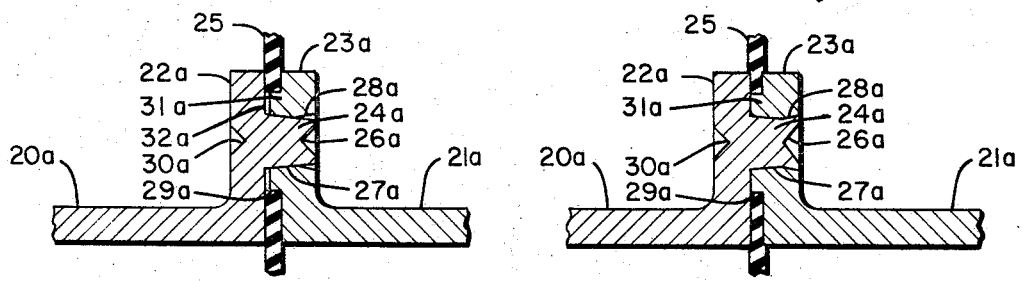
FIG. 4 shows a first modification of the intercell connecting members of FIGS. 1–3 before deformation.
Figure 5:
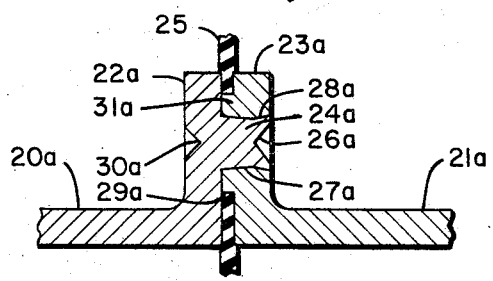
FIG. 5 is a similar vertical sectional view showing the first modification with the elements in their complete, deformed relationship.

Another configuration is shown in FIG. 4 wherein the extension 24a has a slightly tapered cross section to provide for a forced fit in an annular flange 31a formed on the lug 23a. As shown, the flange 31a extends through the opening 29a in the partition 25 a distance of slightly less than the partition thickness. This provides an open space 32a which is closed by metal and partition deformation upon pressure being applied to the exposed and opposed surfaces of the lugs 23a and 22a. FIG. 5 shows the finished assembly of this configuration. The final operation is to apply sufficiently high pressure to the areas defined by the conical recesses 26a and 30a to effect the deformation.

Figure 6:
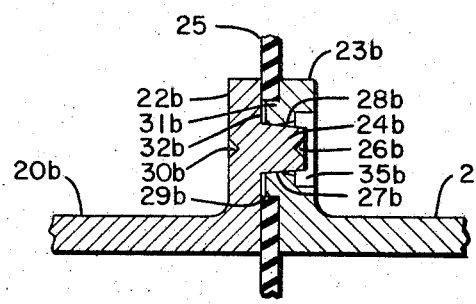
FIG. 6 shows a second modification of the invention with the elements in position prior to deformation.
Figure 7:
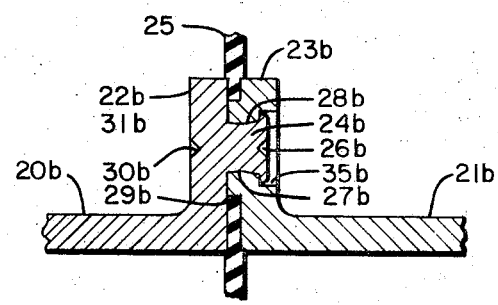
FIG. 7 is a similar view of the second modification in its finished, deformed condition.

A variation of the configuration of FIGS. 4 and 5 is shown in FIGS. 6 and 7. The extension 24b is shorter than the extension 24a and the opening 27b has been recessed as at 35 to conform generally with the shortened extension 24b. FIG. 7 shows the finished assembly of this configuration.

Figure 8:
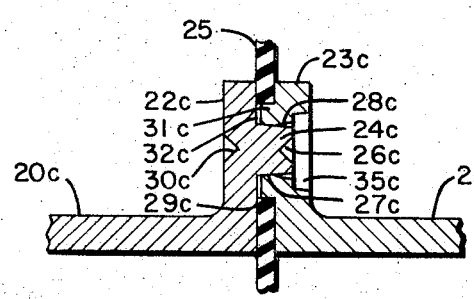
FIG. 8 shows a third modification of the invention with the elements in the pre-deformation condition.
Figure 9:
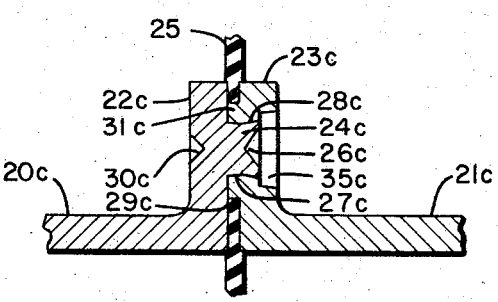
FIG. 9 illustrates the modification of FIG. 8 in its finished, deformed condition.

Another variation is shown in FIG. 8 and the finished assembly in FIG. 9.

Figure 10:
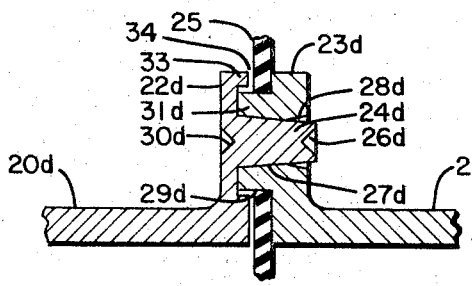
FIG. 10 shows a fourth modification of the invention in vertical section and in the assembled but predeformed condition.
Figure 11:
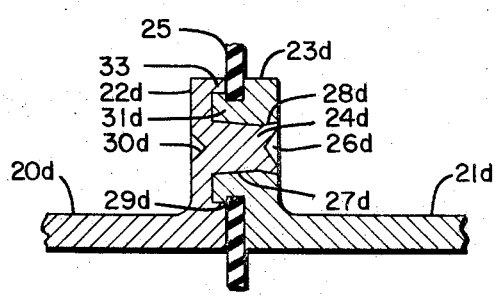
FIG. 11 illustrates the modification of FIG. 10 in its deformed condition.

Still another configuration is shown in FIG. 10 and the finished assembly is shown in FIG. 11.

In assembling the battery, holes 29 of the required size are formed in the partitions 25, the connector straps 20 and 21 are burned onto the lugs of the electrode plates, and the groups of plates and separators are inserted in adjacent cells in conventional manner. Thereafter extensions 24, 24a, 24b, 24c or 24d of the connectors are inserted through the partition openings 29, 29a, 29b, 29c or 29d and through opening 27, 27a, 27b, 27c or 27d of the connector lugs 23. Pressure plates are then applied to the lugs 22 and 23 of the several configurations. For this operation the plate in contact with the connector lug 23 may be formed with an opening to prevent the application of pressure by this plate to the extension 24 of the several configurations. Pressure is then applied in opposite directions in the areas of the recess 26 and to force the connector lugs to expand radially in the partition opening 29. Pressure on the order of and as high as 2000 p.s.i. may be applied in order to obtain the desired sealing and deforming results. The tapered extension 24 of the several configurations is thus wedged through the partition opening 29 and through the opening 27 of the connector lug 23 causing slight deformation of the partition opening 29 and female connector opening 27 and forming a fluidtight seal between the adjacent cells. The male lug 22 and female lug 23 are also forced into sealing contact with the partition 25. The extension 24 of the lug 22 may have the same cross sectional dimension or diameter as the openings in either or both the partition opening 29 or opening 27 of lug 23. The fluidtight seal is obtained by the sealing relationship of the lugs 22 and 23 with opposite faces of the partition 25 and the expanded deformation of the extension 24 and partition opening 29 within the elastic limit of the partition material. This type of sealing action is present to some extent in all of the herein described configurations. However, the wedge shaped extensions 24, 24a, 24b, 24c and 24d, preferably, have preseal cross sectional dimensions slightly greater than the respective openings in the partition 29 and lug openings 27.

After the pressure has been applied to the lugs 22 and 23 to bring these parts into sealing relationship with the partition 25 and the extension 24 into sealing contact with the partition opening 29 and opening 27, the pressure is maintained and a pressure mandrel is inserted through an opening in the pressure plate applied to the lug 23 and to a recessed end surface of the extension 24 whereby to form an expanded end portion in the flared opening 28 in the lug 23. This insures an excellent electrical connection between the lugs 22 and 23 and at the same time causes the extension 24 to expand radially and further insure a corrosion-resistant fluidtight seal between adjacent cells.

The pressure mandrel and plates are then removed and the same process is repeated for the other intercell connector or connectors of the battery. Suitable terminal posts are extended through openings in the battery cover and the latter is applied and secured in place in conventional manner after all cells have been interconnected in series and the terminal posts connected or formed.

Additional strength may be imparted by fusing the outer end portions of the projecting members 24 to the adjacent lugs 23. For this heat fusing operation the battery may be turned on its side so that a suitable torch flame may be caused to impinge on the surfaces where the projections 24, 24a, 24b, 24c or 24d are surrounded by the members 23. Alternately, heat may be applied to the surfaces to be fused by means of a heated heat-conducting tool. Sufficient heat is thus applied to accomplish the desired heat fusion without injury to the plastic material from which the intercell partitions are formed. This material may have a melting temperature on the order of about 160° C. To minimize corrosion by the acid which is most troublesome in the vicinity of the positive electrodes, the preformed male lugs of the intercell connectors are located on the side of the partition 25 in the cell where the straps 20 are used to the positive electrodes. Thus each of the lugs 23 should constitute a terminal of one of the negative electrode straps 21.

I claim:

1. In a storage battery having a container divided by a partition into cells containing groups of plates in each cell, a two-piece intercell connector electrically connecting a group of plates in one cell to another group in the adjoining cell; said two-piece intercell connector comprising, a first connector lug formed with an integral substantially horizontally projecting extension, and a second connector lug formed with an opening to receive said extension; said partition having an opening disposed to be aligned with the opening in said second connector lug, the extension on said first lug passing through said partition opening and into said second lug opening with pressure deformed portions of said lugs and said extension sealing closed the opening in said partition and interlocking said extension in the opening in said second connector lug at one side only of said partition.

2. A structure as defined in claim 1 in which said second connector lug is formed with in annular flange fitting in the opening in said partition and embracing said extension, said flange being pressure expanded to seal closed the edges of said partition opening when said extension is interlocked with said second lug.

3. A structure as defined in claim 1 in which the junction of said extension and second lug is reinforced by heat fusion.

4. A structure in accordance with claim 1 in which the cells at opposite sides of said partition contain groups of plates of positive and negative polarity, said first connector lug being electrically connected to the several positive plates in one cell and said second connector lug being electrically connected to the several negative plates contained in the adjoining cell.

5. In a lead-acid storage battery having a container divided by a partition into cells, and groups of plates of positive and negative polarity in each cell, an intercell connector for electrically connecting the positive plates in one cell with the negative plates in the adjoining cell through said partition comprising: a first connector lug formed integrally with a substantially cylindrical extension and a second connector lug formed with an opening adapted to receive said extension; said partition having an opening disposed to be aligned with said second connector lug opening, said first connector lug extension passing through said opening in said partition and into the opening in said second lug, said extension being compressed axially to expand radially to form a fluid-tight joint at the edges of said partition opening and to form an annular enlargement for engaging said second lug.

6. The structure defined in claim 5 in which said first connector lug is electrically connected to the several positive plates of one cell and said second connector lug is electrically connected to the several negative plates in the adjoining cell.

7. In a lead-acid storage battery having a container divided by a wall partition into cells, with groups of positive and negative polarity plates in each cell, an intercell connector for electrically connecting the positive plates in one cell to the negative plates in an adjoining cell through said partition comprising: a first strap-like lug attached to the negative plates of a cell having a horizontal length extending up to said partition, a shorter vertical length extending up one side of said partition and an integrally formed cylindrically shaped portion extending horizontally from said vertical length through an opening in said partition; a second strap-like lug attached to the positive plates in an adjoining cell having a horizontal length extending up to said partition and a shorter vertical length extending up its side of said partition, said shorter length having an opening receiving the cylindrical portion of said first lug; said cylindrical portion being compressed axially when inserted in the opening in said second lug to expand radially to seal closed the partition opening and to make a strong mechanical attachment to said second lug.

8. The invention as in claim 7 wherein said second lug has a flange around said opening which extends at least part way into the partition opening, said flange being flared radially outward by the radial expansion of said cylindrical portion.

9. The invention as in claim 8 wherein said flange extends completely through the opening in said partition into pressing contact with the vertical portion of said first lug.

10. The invention as described in claim 9 wherein said vertical portion of said first lug as an annular groove around the cylindrical portion on the side facing said partition and the flange on said second lug extends into pressing engagement in said groove.

References Cited

UNITED STATES PATENTS

| | | | |
|---|---|---|---|
| 1,758,506 | 5/1930 | Ford | 136—134 |
| 2,906,804 | 9/1959 | Rigsby | 136—134 |
| 2,942,059 | 6/1960 | Doyle et al. | 136—176 |

FOREIGN PATENTS

| | | |
|---|---|---|
| 869,763 | 6/1961 | Great Britain. |

WINSTON A. DOUGLAS, *Primary Examiner.*

ALLEN B. CURTIS, D. L. WALTON,
*Assistant Examiners.*